United States Patent [19]

Eichweber

[11] Patent Number: 4,893,922

[45] Date of Patent: Jan. 16, 1990

[54] MEASUREMENT SYSTEM AND MEASUREMENT METHOD

[75] Inventor: Kurt Eichweber, Hamburg, Fed. Rep. of Germany

[73] Assignee: Precitronic Gesellschaft fur Feinmechanik und Electronic mbH, Hamburg, Fed. Rep. of Germany

[21] Appl. No.: 291,377

[22] Filed: Dec. 23, 1988

Related U.S. Application Data

[63] Continuation of Ser. No. 935,741, Nov. 28, 1986, abandoned.

[30] Foreign Application Priority Data

Jul. 9, 1986 [DE] Fed. Rep. of Germany ....... 3623083

[51] Int. Cl.⁴ .................. G01C 3/22; B25J 19/00; H04N 7/18
[52] U.S. Cl. .......................... 356/1; 356/21; 356/152; 358/107; 901/47
[58] Field of Search .............. 356/1, 28, 141, 152, 356/383, 384, 20, 21; 358/107; 244/161, 164, 171; 901/47

[56] References Cited

U.S. PATENT DOCUMENTS

| | | | |
|---|---|---|---|
| 3,653,769 | 4/1972 | Albright | 356/1 |
| 3,773,422 | 11/1973 | Stavis et al. | 356/1 |
| 3,796,492 | 3/1974 | Cullen et al. | 356/1 |
| 3,917,196 | 11/1975 | Pond et al. | |
| 4,003,659 | 1/1977 | Conard et al. | 356/152 |
| 4,047,816 | 9/1977 | Pell et al. | 356/152 |
| 4,053,233 | 10/1977 | Bien et al. | 356/141 |
| 4,136,950 | 1/1979 | Labrum et al. | 356/28 |
| 4,297,725 | 10/1981 | Shimizu et al. | 358/125 |
| 4,355,895 | 10/1982 | Cairns et al. | 356/141 |
| 4,373,804 | 2/1983 | Pryor et al. | 356/1 |
| 4,373,808 | 2/1983 | Pell et al. | 356/152 |
| 4,391,514 | 7/1983 | Webster | 356/1 |
| 4,396,945 | 8/1983 | DiMatteo et al. | 358/107 |
| 4,652,917 | 3/1987 | Miller | 358/107 |
| 4,684,247 | 8/1987 | Hammill, III | 356/152 |
| 4,760,269 | 7/1988 | McKenna | 356/1 X |

Primary Examiner—Thomas H. Tarcza
Assistant Examiner—Linda J. Wallace
Attorney, Agent, or Firm—Chilton, Alix & Van Kirk

[57] ABSTRACT

In the measurement system for the measurement of an object (2), the object (2) is provided with two retroreflectors (3, 4) disposed at a known spacing. A measuring device (1) exhibits a light source (5), a video camera (7, 8) and an arrangement (9) which carries out the measurement with reference to the two image points which are formed by the light reflected by the retroreflectors (3, 4). The light source (5) is preferably a flash light source, the flashes of which are synchronized by an arrangement (6) with the imaging sequence of the video camera (7, 8).

15 Claims, 1 Drawing Sheet

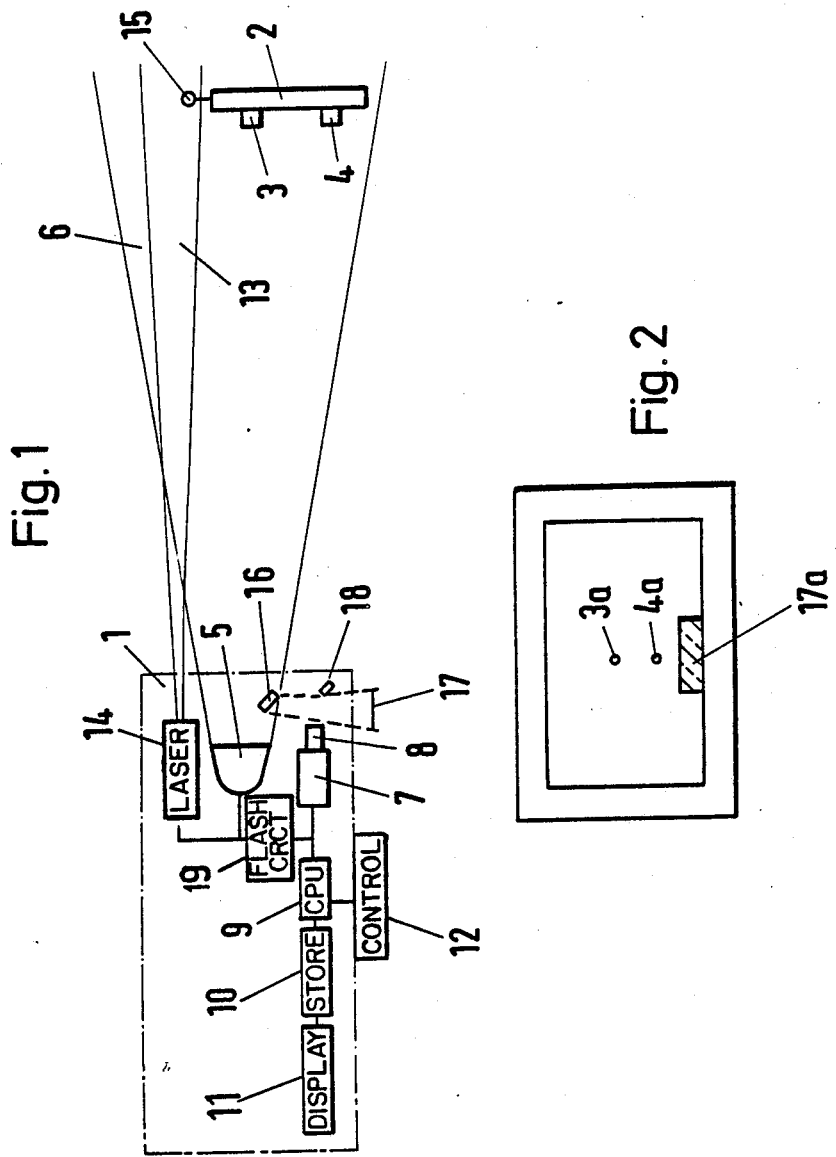

MEASUREMENT SYSTEM AND MEASUREMENT METHOD

This is a continuation of co-pending application Ser. No. 935,741 filed on Nov. 28, 1986, now abandoned.

The invention relates to a measurement system for the measurement of an object, and to a corresponding measurement method.

The measurement of objects, i.e. the determination of their location, their distance, their velocity, their position etc., is normally very costly. It is necessary to determine the position of the object by means of appropriate theodolites or the like; the appropriate measurement values must then be recorded and analyzed. This is very costly, and, especially in the case of moving objects, it is difficult or even impossible to do this, if the object is moving too quickly.

The object of the invention consists in providing a simple measurement system and measurement method, with which the measurement can be undertaken simply, rapidly and with a very high degree of automation.

The solution according to the invention consists in that the object exhibits two retroreflectors disposed at a known spacing, and in that a measuring device is provided, which is provided with a light source, a video camera and an arrangement which carried out the measurement with reference to the two image points which are formed by the light reflected by the retroreflectors.

Retroreflectors, especially triple mirrors, have the property of reflecting back the light, with a very low degree of scatter, substantially in the direction from which it comes. Accordingly, if the object is illuminated by the light source, then in the vicinity of the light source, with a video camera, even at a large distance of the object the light rays reflected by the retroreflectors can clearly be detected and recorded. The locations of these image points in the image of the video camera can then be determined, which can take place automatically by means of appropriate computers and the like. The measurement can then be undertaken on the basis of the known geometry of the arrangement, e.g. the focal length and other imaging properties of the video camera, the instantaneous orientation of the video camera and the known spacing of the retroreflectors.

In this procedure, a white light source can be employed as the light source. An infrared light source can also be employed, which facilitates, in particular, measurement during the day.

Expediently, the light source employed is not a continuous light source, but a light source which emits light flashes, e.g. a flash lamp. In this procedure, the light flashes are advantageously synchronized with the scanning frequency of the video camera. In this manner, on the one hand it is avoided that the image of the retroreflectors is recorded by the camera at unfavourable instants of the scanning cycle. Moreover, such synchronization can facilitate the overcoming of the problems which arise, in particular during the day, on account of the fact that the image of the light reflected by the retroreflectors is dominated by the daylight.

By means of such light flashes and appropriately synchronized video cameras, it is also possible more readily to detect and to measure movements of the object.

It would indeed be possible to employ a normal line camera as the video camera. However, a matrix CCD camera is particularly advantageous, because in this case direct access of the computer to the individual matrix points is possible.

It is particularly advantageous if the measuring device exhibits arrangements for the determination of the distance of the object on the basis of the spacing of the two image points. In this manner, it is possible to carry out a particularly simple determination of the spacing, without complicated transit time measurements, as is the case, for example, with laser range finding measurements. In the course of this procedure, the distance of the object can be determined from the know spacing of the retroreflectors and the imaging geometry.

Advantageously, the measuring device is provided with arrangements for the determination of the relative velocity of the object. Thus, it is possible not only to detect the instantaneous location of the object, but also to record its movement with accuracy. What is involved here is the relative velocity. If the measuring device itself is fixed, then this relative velocity is equal to the actual velocity of the object. If the measuring device is also moving, then the velocity of the measuring device must be subtracted from the relative velocity, in order to determine the absolute velocity of the object.

In a further advantageous embodiment, the measuring device is provided with arrangements for the determination of the swing of the object relative to the measuring device. In this manner, it is not only possible to detect the swing if the object does not stand vertically, i.e. the two retroreflectors are not disposed precisely one above the other or beside one another. Indeed, with due consideration being given to this swing, it is then also possible to carry out a better determination of the correct distance. It is, of course, also possible to carry out flange finding without the explicit measurement of swing, by automatically taking account of the swing.

If the object is stationary or moves only within a very small range, then the measuring device can be fixed. However, if the object moves to a greater extend, then a follow-up adjustment device for the measuring device can be provided, so that the object always remain within the image field, even in the case of a relatively small imaging angle of the measuring device.

Advantageously, arrangements are provided for the transmission of information from the measuring device to the object. In this manner, the object can, for example, be directed from the measuring device to various locations, in order to carry out in this manner the measurement of a territory. In this procedure, the transmission of the information can take place by means of light, e.g. by the light of the light source. For this purpose, the light of the light source can be appropriately modulated, e.g. by variation of the flash repetition frequency.

However, in another advantageous embodiment, the transmission of information is effected by a narrowly concentrated beam, in particular a laser beam of a microwave beam, or by a data radio transmitter. In this manner, less energy is required for the transmission of information. Moreover, laser light, microwave radiation or radio waves can be modulated more simply and in an improved manner, as well as with a larger bandwidth than conventional light. Finally, yet a further advantage of narrow concentration consists in that unauthorized persons cannot tap into the transmission of information.

If the video camera exhibits an objective lense of variable focal length, as well as arrangements for the analysis of a plurality of recordings made with various image angles for the determination of the distance, then the range finding can be carried out with greater accuracy. This is based on the following findings.

In the case of large distances, the following disadvantage can arise. The video camera, e.g. the matrix CCD camera or a line camera, has in the vertical direction (and also in the horizontal direction) a limited resolution of, for example, 500 image points or pixels. This leads also to a limited accuracy of range finding, as is illustrated with reference to the following example.

The object is to have a distance of 1 km, and the retroreflectors at the object are to have a vertical distance of 1 m. Furthermore, the imaging geometry is to be such that the images of the two retroreflectors have a spacing of 25 pixels in the television image. In this, the image of one reflector, if the image of the other reflector is maintained stationary, falls only on the next image point (pixel) when the distance of the object becomes greater or smaller by 40 m. This inaccuracy becomes greater if the object distance becomes greater. At a distance of 3 km, the two images of the retroreflectors would only have a spacing of 8 pixels. Only if the distance changed by one eighth, i.e. by approximately 375 m, would the image of the retroreflector fall on the next image point, i.e. the corresponding inaccuracy would be greater, that is to say 350 m.

These problems can now be avoided or at least very greatly diminished, if the video camera exhibits an objective lens of variable focal length and arrangements are provided for the analysis of a plurality of recordings made with various image angles for the determination of the distance. In this case, it is not so that a change in distance is not detected unless the image falls on the next image point. Instead of this, a plurality of such recordings are made, in which the image has moved already to a greater or lesser extent to the next image point, i.e. is detected with differing intensity on two adjacent image points. From this, electronic means can be employed to calculate a brightness distribution, which, after electronic determination of the mean value, leads to a substantially more accurate measurement of the distance.

Advantageously, arrangements for display/printout of the results are provided. In particular in circumstances in which many measurement values are to be printed out, it is advantageous, because of the limited speed of the printer, to provide an intermediate store for the results.

The measurement can be carried out in a simple manner if the measuring device itself is stationary or executes a known movement. If, however, the measuring device is not stationary and executes a specific movement which is not accurately known, then, advantageously, arrangements are provided for the illumination of a section of the direct environment of the measuring device, as well as arrangements for the imaging of this section by the camera and arrangements for the determination of the specific movement of the measuring device on the basis of changes of the image of the section.

The appropriate part of the environment, which is illuminated by a partial beam and is reflected into the video image, could, for example, be the ground in the environment. If the measuring device moves, then the image section of the ground also moves. From the speed of movement of the grey tones of this image, which speed can be determined electronically, it is then possible to determine the specific movement of the measuring device.

However, if this specific movement is known, then it is possible to determine not only relative velocities of the object, but also the absolute velocities of the latter.

The invention is also further characterized by a method for the measurement of an object, which method is distinguished in that the object is provided with two retroreflectors disposed at a known spacing from one another and is illuminated by a light source, in that the image of the light reflected by the retroreflectors is recorded by a video camera, and in that the measurement is carried out by analysis of the locations and movements of the image points of the retroreflectors.

When reference is made here to retroreflectors, these do not in any sense need to be traditional triple mirrors, which have in all cases only a certain aperture angle of at most 60°. Rather, by way of a retroreflector, it is also possible to provide an entire arrangement of such triple mirrors, which are disposed, for example, around a rod, so that the reflecting action occurs in all directions. In this manner, the measurement is also possible in circumstances in which the object, e.g. a rod, rotates about its own axis during the measurement.

The invention is described below, with the aid of an advantageous embodiment, with reference to the accompanying drawings. In the drawings:

FIG. 1 shows in schematic representation an embodiment of the measurement system according to the invention, and FIG. 2 shows the video image which is analyzed in the case of this embodiment.

The measurement system exhibits a measuring device (1) indicated in broken lines and a target (2), which has, for example, the form of a measuring rod. Two retroreflectors (3 and 4) or appropriate retroreflectors are provided at the target (2).

The measuring device (1) exhibits a light source (5), e.g. a flash lamp in the white light range or infrared range, which emits a cone of light (6), which is directed to the target (2). In this system, the flash sequence of the light source (5) is set by an electronic circuit (19), which is synchronized with the line-scanning frequency or image-scanning frequency of a video camera (7), which is advantageously a matrix CCD camera. The light reflected by the retroreflectors (3 and 4) is recorded by means of this television camera (7), which, for this purpose, is provided with an objective lens (8), which can also have a variable focal length.

The location of the two image points of the retroreflectors (3 and 4) (these image points are designated in FIG. 2 by 3a and 4a) is electronically analyzed in a circuit (9), by which the location of the object (2), the lateral movement of the object (2), a possible vertical movement and also a swing of the object (2) can be determined. In this system, it is particularly advantageous if the camera (7) is a matrix CCD camera, since then a direct access of the computer in the unit (9) to the individual image points is possible.

The results are then placed in intermediate storage in an intermediate store (10) and displayed on a display (11) or printed out there.

With the aid of the central processing unit (9), by means of an arrangement (12) the measuring device (1) is made to execute follow-up adjustment in relation to the object (2), so that the cone of light (6) continues to be directed onto the object (2), even in circumstances in which this object moves or the measuring device (1)

moves. Thereby, at the same time the sharply concentrated beam (13) of a laser (14) is also directed to the object (2) or to a receiver (15) for the laser radiation at the object (2), so that here, by modulation of the laser beam (13), information can be transmitted from the measuring device to the object (2).

By means of a small mirror (16) disposed in the lower region in front of the light source (5), a part of the light beam is deflected downwards, as is shown by broken lines. In this manner, a region of the ground (17) is illuminated. This region of the ground is then likewise recorded by the video camera (7), specifically with the aid of a further small mirror (18), which reflects the image of this region of the ground into the video camera. The result of this is the reflected-in region of the ground, shown at (17a) in FIG. 2) with differing grey tones.

If now the measuring device (1) moves, then this leads to a movement of the grey tones, from which the actual velocity of the measuring device (1) can then be determined with the aid of the circuit (9). This then permits, from the measurement of the relative location and of the relative velocity of the object (2), the determination of the absolute location and the absolute location and the absolute velocity of the object (2).

I claim:

1. A system for the measurement of a target object, comprising:
    first and second retroreflectors carried by the object with a known spacing therebetween, each retroreflector adapted to return substantially all of any light impinging thereon from a light source;
    a measuring device including a light including
        a light source for projecting a single light beam onto both of the retroreflectors from a source location,
        a matrix CCD video camera at the source location oriented to receive first and second reflected source light beams from the first and second retroreflectors and to generate respective first and second image points,
        means for analyzing the distance relationship of the first and second image points in the camera to determine the measurement attributes of at least location of the object relative to the source location, and
    means for transmitting information from the measuring device to the object.

2. The Measurement system according to claim 1, characterized in that the light source (5) is a white light source.

3. The Measurement system according to claim 1, characterized in that the light source (5) is an infrared light source.

4. Measurement system according to claim 1, characterized in that the light source (5) emits light flashes.

5. The measurement system according to claim 4, characterized in that the video camera has a scanning frequency and the light flashes are synchronized with the scanning frequency of the video camera (7,8).

6. The measurement system according to claim 1, characterized in that the means for analyzing includes means for the determination of the relative velocity of the object and the measuring device.

7. The measurement system according to claim 1, characterized in that the system includes means for adjusting the measuring device to maintain the light beam projected on the object and that the transmission of information is effected by another, narrowly concentrated beam of radiation.

8. The measurement system according to claim 1, characterized in that the transmission of the information takes place by means of light.

9. The measurement system according to claim 1, characterized in that the video camera (7,8) includes an objective lens (8) of variable focal length and the means for analyzing include means for the analysis of a plurality of recordings made with varying image angles for the determination of the distance between the object and the measuring device.

10. The measurement system according to claim 1, characterized in that the system includes means for displaying the determined measurement attribute.

11. The measurement system according to claim 10, characterized in that the system further includes an intermediate data storage means (10) for the determined measurement attribute.

12. The measurement system according to claim 1, characterized in that the system includes means for the illumination of a section (17) of the immediate environment of the measuring device, means (18) for the imaging of this section 17 by the camera (7,8) and means (9) for the determination of the specific movement of the measuring device (1) on the basis of changes of the image (17a) of the section (17).

13. The measurement system according to claim 1, wherein the means of analyzing is responsive to the focal length of the video camera, the instantaneous orientation of the video camera, and the known spacing of the retroreflectors.

14. A system for the measurement of a target object, comprising:
    first and second retroreflectors carried by the object with a known spacing therebetween, each retroreflector adapted to return substantially all of any light impinging thereon from a light source;
    a measuring device including a light including
        a light source for projecting a single light beam onto both of the retroreflectors from a source location,
        a matrix CCD video camera at the source location oriented to receive first and second reflected source light beams from the first and second retroreflectors and to generate respective first and second image points,
        means for analyzing the distance relationship of the first and second image points in the camera to determine the measurement attributes of at least location of the object relative to the source location, and
    means for displaying the determined measurement attribute.

15. The measurement system according to claim 14, characterized in that the system further includes an intermediate data storage means (10) for the determined measurement attribute.

* * * * *